United States Patent

Hoeksta

[11] Patent Number: 6,102,420
[45] Date of Patent: Aug. 15, 2000

[54] WALKING CYCLE WITH STEERABLE FRONT AND REAR WHEEL

[75] Inventor: Wietse Hoeksta, Renkum, Netherlands

[73] Assignee: Archimedec Handelsonderneming V.O.F., Renkum, Netherlands

[21] Appl. No.: 09/129,382

[22] Filed: Aug. 5, 1998

[51] Int. Cl.$^7$ .................................................. B62K 1/00
[52] U.S. Cl. ............................ 280/269; 280/267; 482/68
[58] Field of Search ................................... 280/267, 268, 280/269, 270; 482/66, 67, 68, 69

[56] References Cited

U.S. PATENT DOCUMENTS

| | | | |
|---|---|---|---|
| 89,443 | 4/1869 | Smith | 280/267 |
| 265,996 | 10/1882 | Trekell | 280/267 |
| 2,207,161 | 7/1940 | Roe | 280/269 |
| 2,812,194 | 11/1957 | Ajero | 280/269 |
| 3,620,547 | 11/1971 | Vavarek . | |
| 4,065,145 | 12/1977 | Chambers . | |
| 4,239,248 | 12/1980 | Ewers | 482/68 |
| 4,506,902 | 3/1985 | Maebe | 280/267 X |
| 4,555,122 | 11/1985 | Harvey . | |
| 4,657,272 | 4/1987 | Davenport . | |
| 4,733,742 | 3/1988 | Frye | 280/267 X |
| 5,167,597 | 12/1992 | David | 482/68 |
| 5,833,320 | 11/1998 | Kaneko et al. . | |
| 5,954,349 | 9/1999 | Rutzel | 280/267 |

FOREIGN PATENT DOCUMENTS

| | | |
|---|---|---|
| 4491 | 5/1901 | Denmark . |
| 571599 | 9/1923 | France . |
| 117016 | 8/1899 | Germany . |
| 817539 | 7/1959 | United Kingdom . |

*Primary Examiner*—Brian L. Johnson
*Assistant Examiner*—Bryan Fischmann
*Attorney, Agent, or Firm*—Young & Thompson

[57] ABSTRACT

A riding apparatus includes a frame; a front wheel assembly, being rotatably mounted to the frame and having a substantially vertical front rotation axis; a rear wheel assembly, being rotatably mounted to the frame and having a substantially vertical rear rotation axis; a front steering link connected to the front wheel assembly; a rear steering link connected to the rear wheel assembly; and a pivoting device; the front steering link and rear steering link being connected to the pivoting device in such a way that the pivoting device translate an angular movement of the front wheel assembly around the front rotation axis into a deflection of the rear wheel assembly around the rear rotation axis in the opposite sense, thereby diminishing the steering radius of the riding apparatus; and a saddle mounted on the frame by a saddle pin, the saddle pin being rotatably mounted to the frame and having a substantially vertical saddle rotation axis, the pivoting device being fixedly coupled to the saddle pin, thereby enabling the steering of the riding apparatus by the saddle.

19 Claims, 2 Drawing Sheets

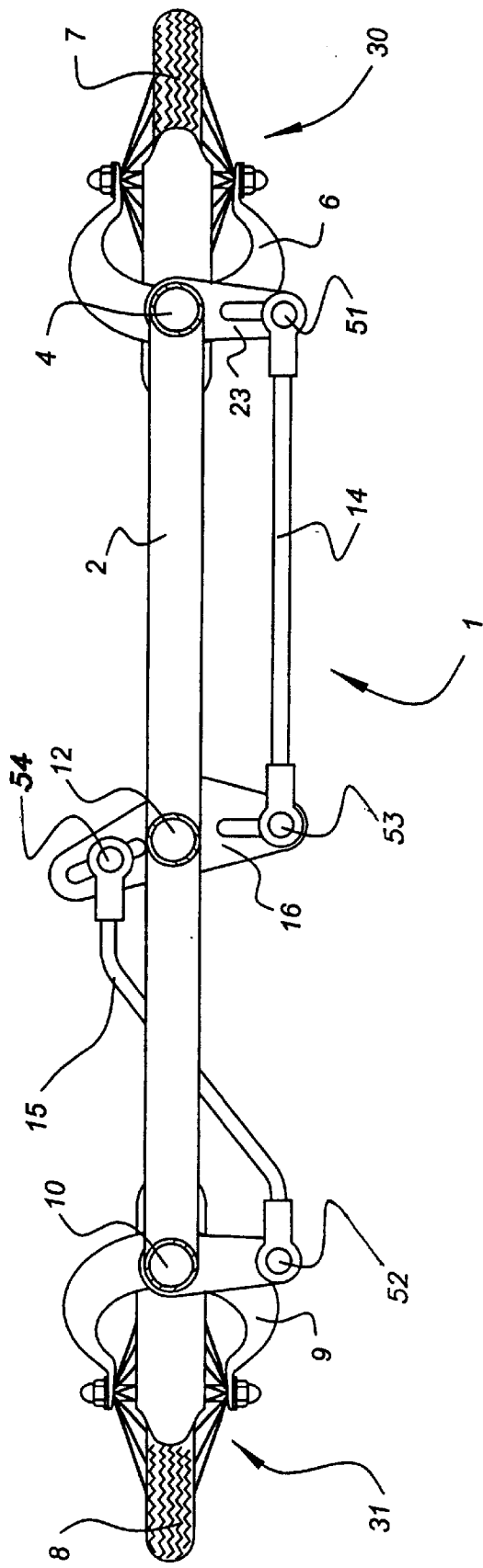

WALKING CYCLE WITH STEERABLE FRONT AND REAR WHEEL

BACKGROUND OF THE INVENTION

This invention relates to a riding apparatus with, steerable front and rear wheel assemblies in general and, more specifically, to a walking cycle enabling a person to walk while seated.

A riding apparatus with front and rear wheels which are steerable with respect to each other and with respect to a frame are well known in the state of the art.

Great Britain Patent no. 11,693 discloses an arrangement by means of which the steering and guiding capabilities of a cycle are increased. This is accomplished by the fact that both the front wheel and the rear wheel are mounted pivotally with respect to the frame. The front wheel and rear wheel are connected by a coupling rod in such a way that the front and rear wheel deviate either in the same direction or in opposite direction. In the first embodiment, a steering action will lead to both wheels turning in the same direction, moving the cycle away sidewards from its original path thereby avoiding an object on the road for both wheels. In the second embodiment, the opposite action of the wheels will lead to a much smaller turning radius of the cycle. According to this patent, the saddle of the cycle is fixedly connected to the rear wheel, enabling the cyclist to steer the cycle without hands. The saddle turns in the same direction as the rear wheel, and depending on the embodiment, the front wheel turns in the same or opposite direction. The cycle according to this patent is driven by a known chain and pedal arrangement to enable the cyclist to propel the cycle.

Other arrangements of cycles with steerable front and rear wheel are known, in which the front and rear wheel can be turned independently of each other. For instance, U.S. Pat. No. 4,506,902 shows a bicycle comprising front and rear wheel assemblies which are independently steerable. The front wheel can be steered by a handlebar which is fixedly connected to the fork of the front wheel assembly, and the rear wheel can be steered by the saddle which is fixedly connected to the fork of the rear wheel assembly. The bicycle also comprises a pedal crank which is mounted on the axle of the rear wheel.

A disadvantage of the known steering arrangements for bicycles is the inherent instability. This is aggravated when the coupling arrangements for the front and rear wheels is applied to walking cycles. Walking cycles are pushed forward by the cyclist by pushing off his feet in the opposite direction of movement. This manner of propulsion aggravates the instability of cycles with steerable wheels. The earliest walking cycles therefore had no steerable wheels at all and when a cyclist wanted to turn, he would have to stop and lift the cycle to point it at the right direction.

The goal of the present invention is to provide a riding apparatus for cycling while seated with steerable front and rear wheels that provides sufficient stability and agility.

SUMMARY OF THE INVENTION

The present invention provides an improved riding apparatus for riding while seated with improved agility and stability. The riding apparatus according to the present invention can be steered by the saddle through the hips.

Accordingly, the present riding apparatus comprises a frame, a front wheel assembly, being rotatably mounted to said frame and having a substantially vertical front rotation axis, a rear wheel assembly, being rotatably mounted to said frame and having a substantially vertical rear rotation axis, a front steering link connected to said front wheel assembly, a rear steering link connected to said rear wheel assembly, and pivoting means, said front steering link and rear steering link being connected to said pivoting means in such a way that said pivoting means translate an angular movement of said front wheel assembly-around said front rotation axis into a deflection of said rear wheel assembly around said rear rotation axis in the opposite sense, thereby diminishing the steering radius of the riding apparatus, and a saddle mounted on said frame by means of a saddle pin, said saddle pin being rotatably mounted to said frame and having a substantially vertical saddle rotation axis, said pivoting means being fixedly coupled to said saddle pin, thereby enabling the steering of said riding apparatus by means of said saddle.

In a preferred embodiment of the riding apparatus according to the present invention, said front steering link is attached to said front wheel assembly and pivoting means in a parallel manner, such that said front wheel assembly and said saddle rotate in the same direction. This provides for a very agile and stable riding apparatus for walking while seated. In operation, the riding apparatus can be steered by rotating the saddle by the hips in the desired direction, which steering action can be supported by the hands, arms and shoulders by moving the steering means in the same direction. The front and rear steering link can be replaced by other linking means that translate the rotating movements and that are known to the person skilled in the art, e.g. cables or a rack and pinion mechanism.

According to a further embodiment, said front steering link can be attached at a variable distance to said front wheel assembly and pivoting means, respectively, thereby providing an adjustable ratio of the deflection of said front wheel assembly and saddle. In a similar manner, said rear steering link can be attached at a variable distance to said pivoting means and rear wheel assembly, respectively, thereby providing an adjustable ratio of the deflection of said saddle and rear wheel assembly.

In the preferred embodiment of the riding apparatus according to the invention, said saddle pin is mounted at the rear half of said frame. As already mentioned before, the saddle is used primarily for steering the riding apparatus. By positioning the saddle in the rear half of the riding apparatus, the stability and agility of the riding apparatus are improved. Preferably, the saddle is positioned at a position between 50% and 60%, e.g. 55%, of the distance between said front rotation axis and said rear rotation axis. This will improve the stability and steerability of the riding apparatus.

To be able to steer the riding apparatus comfortably and precisely, the saddle used is preferably a unicycle saddle. This increases the ability to steer the riding apparatus by the hips.

To increase the riding comfort of the riding apparatus according to the present invention, the saddle is provided with damping means, e.g. rubber blocks, to dampen the vibrations and shocks that are generated during riding.

In a further embodiment, said front steering assembly comprises a steering member including at least one handgrip. This enables the steering of the riding apparatus via the hands, arms and shoulders. In practice, the steering will be performed for 70% by the hips and for the remaining 30% by the hands, arms and shoulders.

In a second aspect of the invention according to the present invention, the riding apparatus comprises a frame, a front wheel assembly, being rotatably mounted to said frame and having a substantially vertical front rotation axis, a rear wheel assembly, being rotatably mounted to said frame and having a substantially vertical rear rotation axis, a front steering link connected to said front wheel assembly, a rear steering link connected to said rear wheel assembly, and pivoting means, said front steering link and rear steering link being connected to said pivoting means in such a way that said pivoting means translate an angular movement of said front wheel assembly around said front rotation axis into a deflection of said rear wheel assembly around said rear rotation axis in the opposite sense, thereby diminishing the steering radius of the riding apparatus, and a saddle mounted on said frame by means of a saddle pin, said saddle pin being rotatably mounted to said frame and having a substantially vertical saddle rotation axis, said pivoting means being fixedly coupled to said saddle pin, thereby enabling the steering of said riding apparatus by means of said saddle, in which said front steering link is attached to said front wheel assembly and pivoting means in a parallel manner, such that said front wheel assembly and said saddle rotate in the same directions. In this embodiment, the saddle rotates in the same sense to the steering means, providing an alternative to the embodiment according to the first embodiment.

It will be clear to the person skilled in the art, that the riding apparatus according to the present invention will include various features already known, such as adjustable steering bar height and orientation, adjustable saddle height, etc, to be able to obtain an ideal personal riding posture.

BRIEF DESCRIPTION OF THE DRAWINGS

FIG. 2 is a top view of a riding apparatus according to a preferred embodiment of the present invention, with the steer and saddle is assembled.

DESCRIPTION OF THE PREFERRED EMBODIMENT

Figure 1:
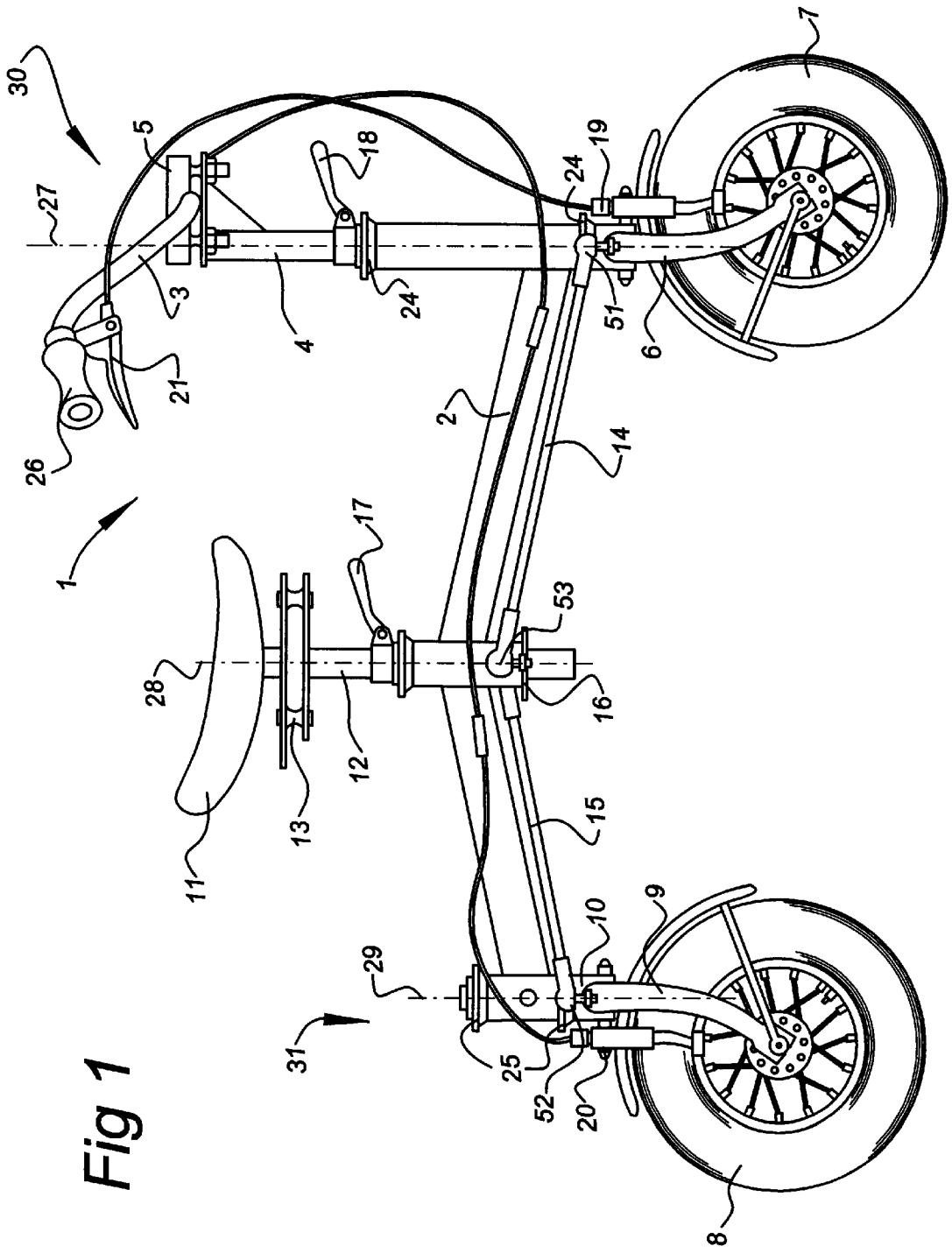
FIG. 1 is a side view of a riding apparatus according to a preferred embodiment of the present invention.

FIG. 1 shows a side view of a riding apparatus 1 according to a preferred embodiment of the present invention. The riding apparatus 1 comprises a frame 2 made of a rigid material. The riding apparatus 1 further comprises a front wheel assembly 30, including a steering bar 3 connected to a first end of a steering pin 4 by means of a steering clamp 5. The steering bar 3 may comprise two hand grips 26 and enables to steer the riding apparatus 1 by means of the hands, arms and shoulders in a conventional manner. On the other end, the steering pin 4 is connected to a front fork 6. The front wheel 7 is mounted in the front fork 6 by conventional means. Therefore, the front wheel assembly 30 forms one rigid unit. The steering pin 4 of the front wheel assembly 30 is mounted into the frame 2 by means of bearings 24 enabling rotation of the steering pin 4 with respect to the frame 2 around the vertical front rotation axis 27.

The rear wheel assembly 31 comprises a rear wheel 8, mounted in a rear fork 9, which in its turn is connected to a rear wheel pin 10. The rear wheel pin 10 is mounted to the frame 2 by means of bearings 25 in a comparable way as the steering pin 4, enabling rotation of the rear wheel assembly 31 around the vertical rotation axis 29. Furthermore, the riding apparatus comprises a saddle 11 mounted on a saddle pin 12, said saddle pin being pivotally mounted in the frame 2 around a vertical saddle rotation axis 28, in a manner comparable to the mounting of the steering pin 4 and the rear wheel pin 10. In this preferred embodiment, the saddle 11 is provided with damping means 13, which may be made, of rubber blocks or the like. This will increase the riding comfort of the riding apparatus 1 according to the present invention by dampening the vibrations and shocks that are generated during riding.

The front wheel assembly 30 is coupled to a first end of a front steering link 14 by means of a ball and socket joint 51 and the rear wheel assembly 31 is coupled to a first end of a rear steering link 15 by means of a ball and socket joint 52. The other ends of the front steering link 14 and rear steering link 15 are coupled to pivoting means 16 by ball and socket joints 53 and 54,respectively, as shown by FIG. 2. The pivoting means 16 are mounted to the saddle pin 12, thereby enabling steering of the riding apparatus 1 by means of hip movements. The manner in which the front and rear linking means are coupled to the pivoting means 16 and the front wheel assembly 30 and rear wheel assembly 31, respectively, will be clarified by the description referring to FIG. 2.

As in conventional riding apparatus, the saddle pin 12 is constructed such that the sitting height of the saddle 11 can be adjusted by saddle adjustment means 17. Also, the steering pin 4 is constructed such that the height of the steering bar 3 can be adjusted by steering bar adjustment means 18. The steering clamp 5 enables adjustment of the orientation of the steering bar 3. Furthermore, the riding apparatus 1 can be fitted with front wheel brakes 19 and rear wheel brakes 20, which can be actuated by respective brake handles 21, 22 on the steering bar 3.

Now referring to FIG. 2, a top view is shown of the riding apparatus 1 according to a preferred embodiment of the present invention, with the steering bar 3, steering pin 4, saddle 11 and saddle pin 12 disassembled. This enables a view of the construction of the attachment of the front linking means 14 and rear linking means 15 to the pivoting means 16 and the front wheel assembly 30 and rear wheel assembly 31, respectively.

A lever 23 is attached to the front wheel assembly 30, substantially perpendicularly to the steering pin 4 and extending to one side of the frame 2. A rotation of the front wheel assembly 30 will therefore result in a circular movement of the end of the lever 23 with the axis of movement equal to the steering pin 4. One end of the front steering link 14 is attached to the end of the lever 23. The other end of the front steering link 14 is attached to the pivoting means 16, on the same side of the frame 2. This parallel construction of the front steering link 14, lever 23 and pivoting means 16 assures that the front wheel 7 and the saddle 11 deflect in the same direction with respect to the frame 2.

In an alternative embodiment, the distance of the steering pin 4 to the attachment of the front steering link 14 with the first lever 23 and/or the distance of the saddle pin 11 to the attachment of the front steering link 14 with the pivoting means 16 can be varied, enabling a variation of the ratio of deflection of the front wheel 7 and he saddle 11.

One end of the rear linking means 15 is connected to the other side of the pivoting means 16, i.e. the rear linking means 15 and front linking means 14 are connected at opposite sides of the pivoting means 16 with respect to the saddle 11. The other end of the rear linking means 15 is attached to the rear wheel assembly 31 on the opposite side of the frame 2. This crosslink construction of the rear linking means 15 assures that the rear wheel 8 deflects in the opposite direction from the front wheel 7 at all times.

Similarly to the front steering link 14, the distance of the rear wheel pin 10 to the attachment of the rear steering link 15 with the rear wheel assembly 31 and/or the distance of the saddle pin 11 to the attachment of the rear steering link 15 with the pivoting means 16 can be varied, enabling a variation of the ratio of deflection of the rear wheel 8 and the saddle 11, and thus also of the ratio of deflection of the front wheel 7 and the rear wheel 8.

In essence, the pivoting means 16 provide a similar attachment function as the first lever 23, both for the front steering link 14 and for the rear steering link 15, enabling attachment with varying distance to the saddle pin 12.

Although the figures show that the front and rear linking means 14, 15 are positioned underneath the frame 2, it will be clear to the person skilled in the art that this is just one of many possibilities. Also, it will be clear that the front and rear steering link 14, 15 can be replaced by other linking means that translate the rotating movements of front wheel assembly 30, rear wheel assembly 31 and saddle 11 and that are known to the person skilled in the art, e.g. cables or a rack and pinion mechanism.

The riding apparatus 1 as described provides for a very agile and stable riding apparatus 1 for walking while seated. In operation. the riding apparatus 1 can be steered by rotating the saddle 11 by the hips in the desired direction, which steering action can be supported by the hands, arms and shoulders by moving the front steering assembly 30 in the same direction. Primarily, the saddle 11 is used for steering the riding apparatus 1. By positioning the saddle 11 in the rear half of the riding apparatus 1, the stability and agility of the riding apparatus 1 are improved. Preferably, the saddle 11 is positioned at about 55% of the total length of the riding apparatus 1, measured from the front of the riding apparatus 1.

In an exemplary embodiment, the total length of the riding apparatus 1 is about 112 cm, while the distance between the front rotation axis 27 and rear rotation axis 29 is about 70 cm. The saddle pin 12 is positioned at 40 cm (=55%) from the front rotation axis 27.

To be able to steer the riding apparatus I comfortably and precisely, the saddle 11 used is preferably a unicycle saddle. This increases the ability to steer the riding apparatus 1 by the hips.

In a second aspect of the invention according to the present invention, the front steering link 14 is connected in parallel, while the rear steering link 15 is cross connected with the frame 2. In this embodiment, the saddle and the front wheel assembly 30 rotate in a sense opposite to the rear wheel assembly 31.

It will be clear to the person skilled in the art that other modifications are readily apparent without departing from the scope of the invention.

What is claimed, is:

1. A riding apparatus comprising:
    a frame;
    a front wheel assembly, being rotatably mounted to said frame and having a substantially vertical front rotation axis;
    a rear wheel assembly, being rotatably mounted to said frame and having a substantially vertical rear rotation axis;
    a front steering link connected to said front wheel assembly;
    a rear steering link connected to said rear wheel assembly; and
    a pivoting means having a pivot axis positionally fixed to said frame; said front steering link and rear steering link being connected to said pivoting means in such a way that said pivoting means translate an angular movement of said front wheel assembly around said front rotation axis into a deflection of said rear wheel assembly around said rear rotation axis in the opposite sense, thereby diminishing the steering radius of said riding apparatus; and
    a saddle mounted on said frame by a saddle pin located between said front and rear assemblies, said saddle pin being rotatably mounted to said frame and having a substantially vertical saddle rotation axis, said pivoting means being fixedly coupled to said saddle pin, thereby enabling the steering of said riding apparatus by means of said saddle.

2. A riding apparatus according to claim 1, in which said front steering link is attached to said front wheel assembly and pivoting means in a parallel manner, such that said front wheel assembly and said saddle rotate in the same direction.

3. A riding apparatus according to claim 2, in which said front steering link can be attached at a variable distance to said front wheel assembly and pivoting means, respectively, thereby providing an adjustable ratio of the deflection of said front wheel assembly and saddle.

4. A riding apparatus according to claim 2, in which said rear steering link can be attached at a variable distance to said pivoting means and rear wheel assembly, respectively, thereby providing an adjustable ratio of the deflection of said saddle and rear heel assembly.

5. A riding apparatus according to claim 2, in which said saddle pin is mounted at the rear half of said frame.

6. A riding apparatus according to claim 5, in which said saddle pin is mounted at a position between 50% and 60% of the distance between said front rotation axis and said rear rotation axis.

7. A riding apparatus according to claim 2, in which said saddle is a unicycle saddle.

8. A riding apparatus according to claim 2, in which said saddle is provided with damping means.

9. A riding apparatus according to claim 8, in which said damping means comprise rubber blocks.

10. A riding apparatus according to claim 2, in which said front steering assembly comprises a steering member including at least one handgrip.

11. A riding apparatus comprising:
    a frame;
    front wheel assembly, being rotatably mounted to said frame and having a substantially vertical front rotation axis;
    a rear wheel assembly, being rotatably mounted to said frame and having a substantially vertical rear rotation axis;
    a front steering link connected to said front wheel assembly;
    a rear steering link connected to said rear wheel assembly;
    pivoting means having a pivot axis positionally fixed to said frame; said front steering link and rear steering link being connected to said pivoting means in such a way that said pivoting means translate an angular movement of said front wheel assembly around said front rotation axis into a deflection of said rear wheel assembly around said rear rotation axis in the opposite sense, thereby diminishing the steering radius of said riding apparatus; and
    a saddle mounted on said frame by a saddle pin located between said front and rear wheel assemblies, said saddle pin being rotatably mounted to said frame and having a substantially vertical saddle rotation axis, said pivoting means being fixedly coupled to said saddle pin, thereby enabling the steering of said riding apparatus by means of said saddle;

in which said front steering link is attached to said front wheel assembly and pivoting means in a parallel manner, such that said front wheel assembly and said saddle rotate in same directions.

12. A riding apparatus according to claim 11, in which said front steering link can be attached at a variable distance to said front wheel assembly and pivoting means, respectively, thereby providing an adjustable ratio of the deflection of said front wheel assembly and saddle.

13. A riding apparatus according to claim 11, in which said rear steering link can be attached at a variable distance to said pivoting means and rear wheel assembly, respectively, thereby providing an adjustable ratio of the deflection of said saddle and rear wheel assembly.

14. A riding apparatus according to claim 11, in which said saddle pin is mounted at the rear half of said frame.

15. A riding apparatus according to claim 14, in which said saddle pin is mounted at a position between 50% and 60% of the distance between said front rotation axis and said rear rotation axis.

16. A riding apparatus according to claim 11, in which said saddle is a unicycle saddle.

17. A riding apparatus according to claim 11, in which said saddle is provided with damping means.

18. A riding apparatus according to claim 17, in which said damping means comprise rubber blocks.

19. A riding apparatus according to claim 11, in which said front steering assembly comprises a steering member including at least one handgrip.

* * * * *